US006371230B1

(12) United States Patent
Ciarla et al.

(10) Patent No.: US 6,371,230 B1
(45) Date of Patent: Apr. 16, 2002

(54) DEVICE FOR THE COMBINED RENTING OF ELECTRICALLY DRIVEN VEHICLES, ESPECIALLY SCOOTERS, AND THE EXCHANGE AND RECHARGING OF THE VEHICLE BATTERIES

(76) Inventors: Alberto Ciarla, Via L. Tempesta 41, Roma (IT), 00151; Fabio Lenci, Viale W. Shakespeare 69, Roma (IT), 00144

( * ) Notice: Subject to any disclaimer, the term of this patent is extended or adjusted under 35 U.S.C. 154(b) by 577 days.

(21) Appl. No.: 09/077,102
(22) PCT Filed: Nov. 21, 1996
(86) PCT No.: PCT/IT96/00217
  § 371 Date: May 20, 1998
  § 102(e) Date: May 20, 1998
(87) PCT Pub. No.: WO97/18976
  PCT Pub. Date: May 29, 1997

(30) Foreign Application Priority Data
Nov. 21, 1995 (IT) ............................. FI95A0236

(51) Int. Cl.⁷ ............................. B60R 16/04; B60S 5/06
(52) U.S. Cl. ..................... 180/68.5; 320/109; 414/390
(58) Field of Search ..................... 180/68.5; 414/786, 414/390, 398, 351, 281, 282, 809, 808; 320/2, 109, 128

(56) References Cited

U.S. PATENT DOCUMENTS

| | | | | |
|---|---|---|---|---|
| 3,803,778 A | * | 4/1974 | Short | 52/33 |
| 4,334,819 A | * | 6/1982 | Hammerslag | 414/395 |
| 4,983,903 A | * | 1/1991 | Bae et al. | 320/2 |
| 5,140,316 A | * | 8/1992 | DeLand et al. | 340/825.69 |
| 5,187,423 A | * | 2/1993 | Marton | 320/2 |
| 5,549,443 A | * | 8/1996 | Hammerslag et al. | 414/786 |
| 5,612,606 A | * | 3/1997 | Guimarim et al. | 320/2 |

* cited by examiner

Primary Examiner—J. J. Swann
Assistant Examiner—David R. Dunn
(74) Attorney, Agent, or Firm—Breiner & Breiner, L.L.C.

(57) ABSTRACT

The subject of the present invention is a device for renting electrically driven vehicles and for exchanging and recharging the vehicle batteries (5), comprising a box-shaped structure (1) with the means for accommodating the vehicles and the mechanical devices (80) for removing and fitting the batteries (5) from and into the vehicle, besides a device (20) for housing and placing the batteries (5) into a number of recharging spaces (13), and conveyors (160, 180) for opening and closing the various doors (14, 9) and, at the same time, locking the vehicle (2) inside its housing (3), and, lastly, the electrical and electronic connections (60, 130, 230) between the batteries and the mains (220 V) and between the housings and the vehicles.

12 Claims, 6 Drawing Sheets

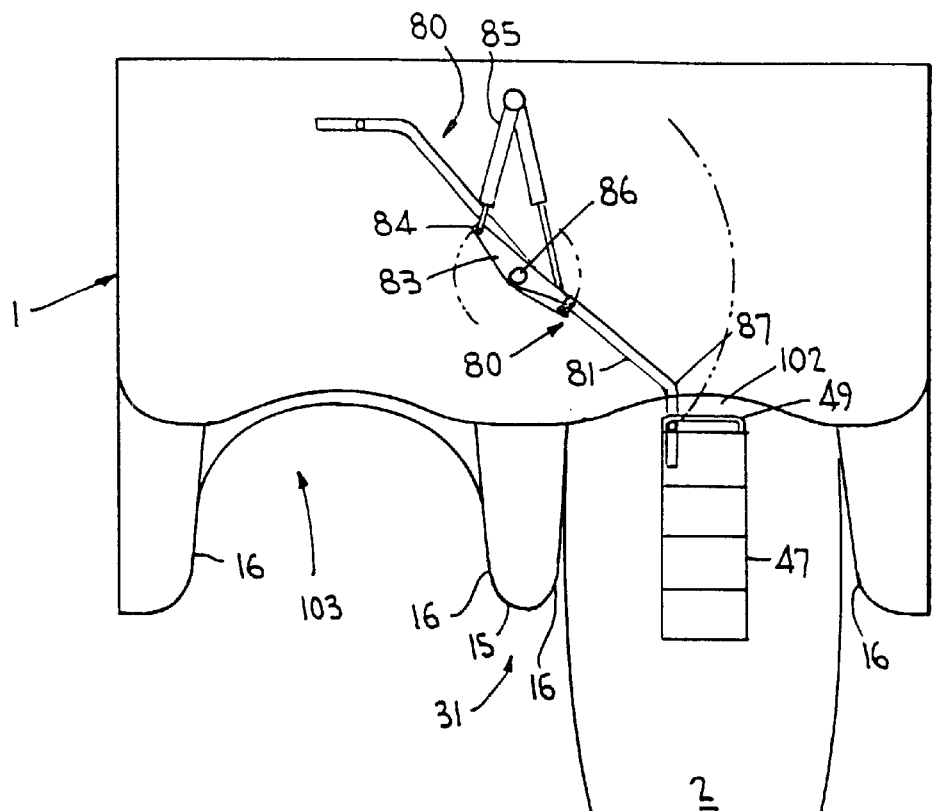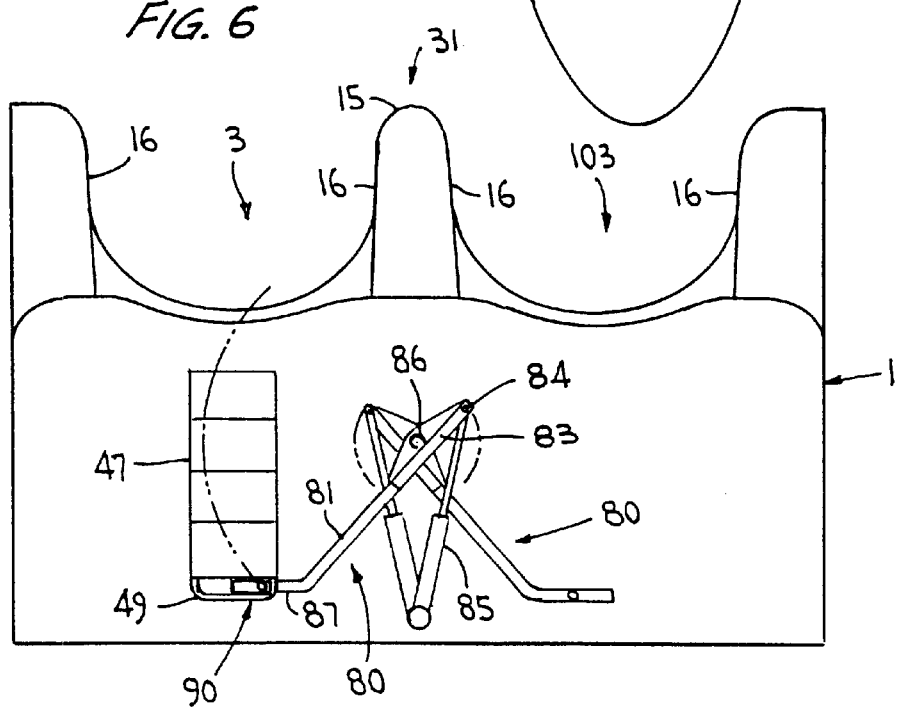

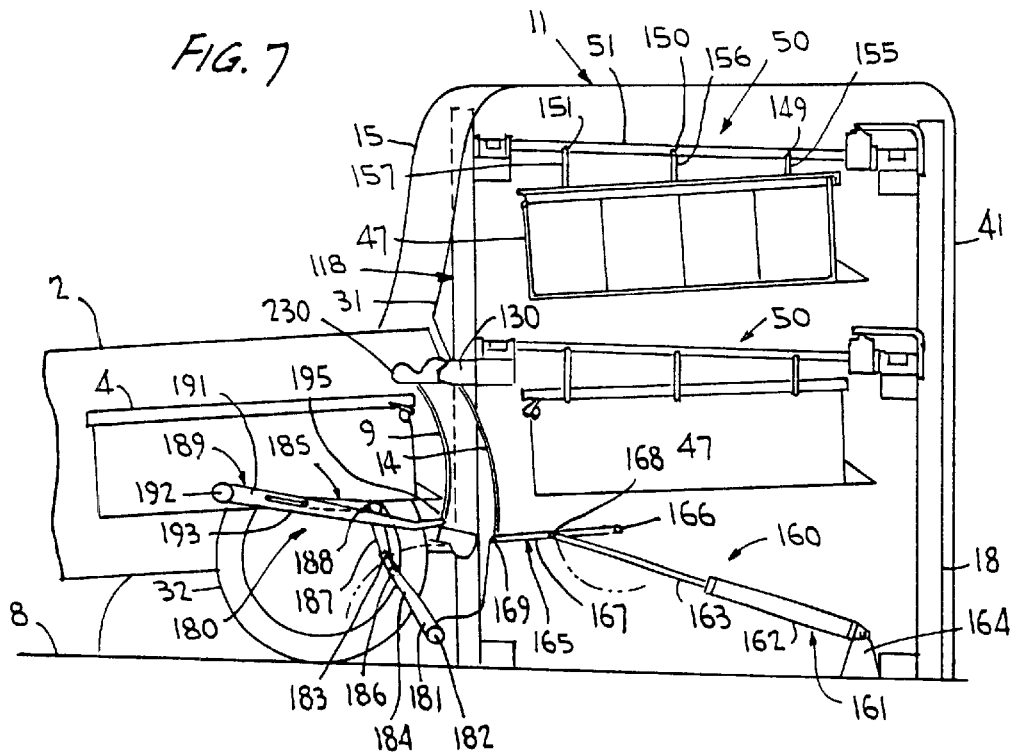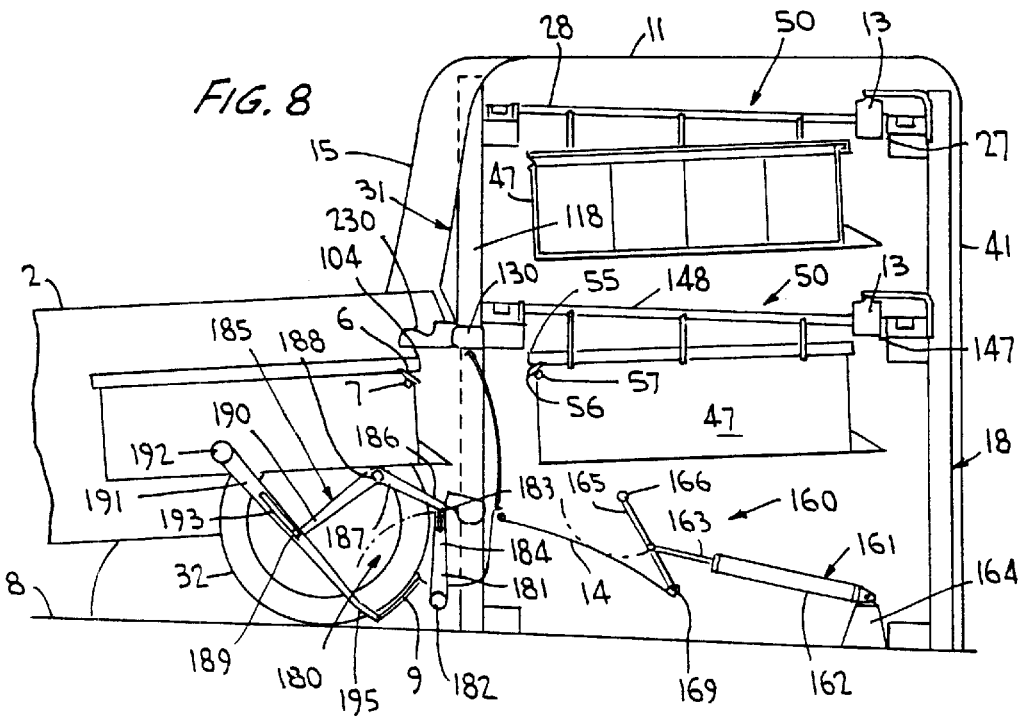

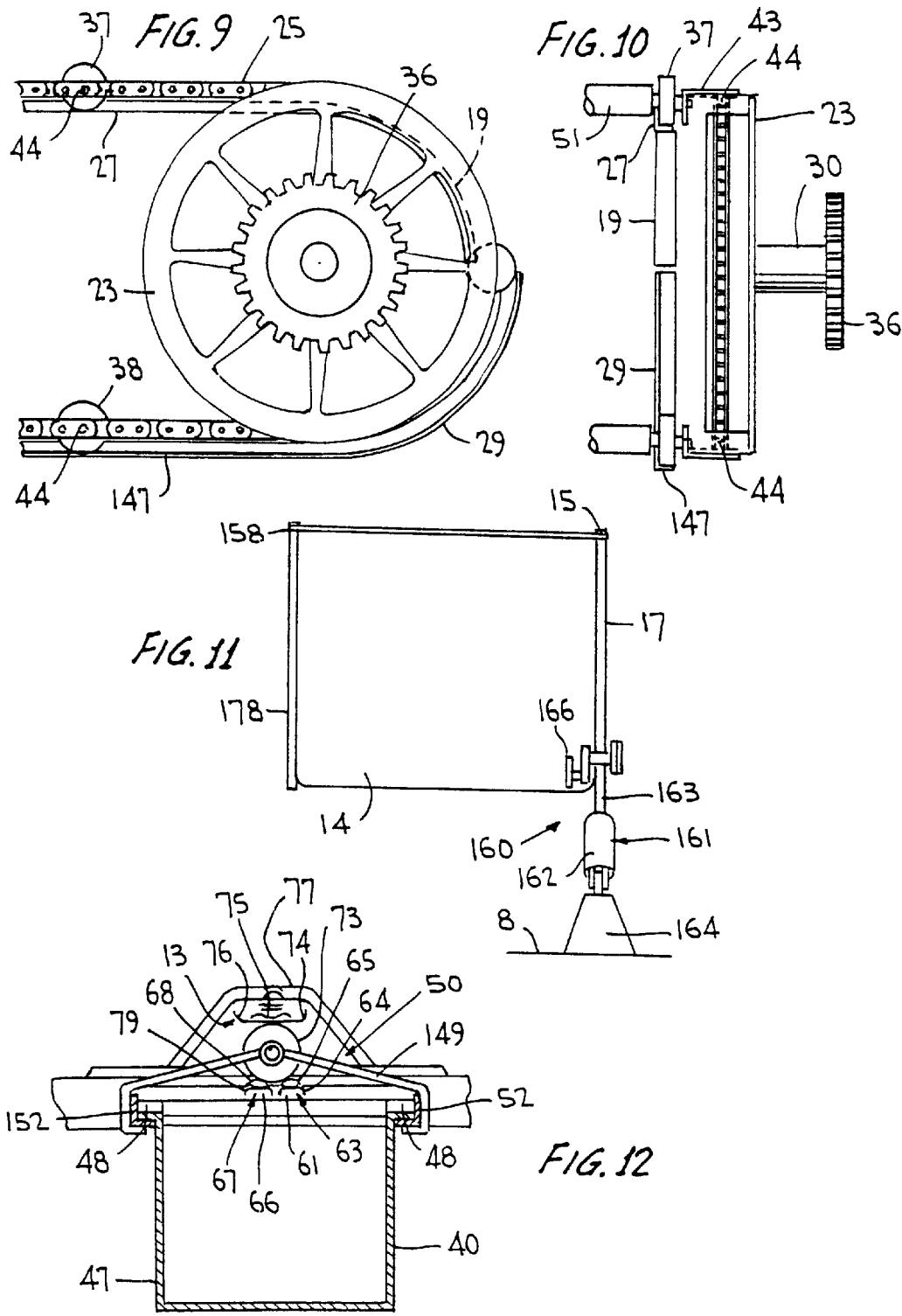

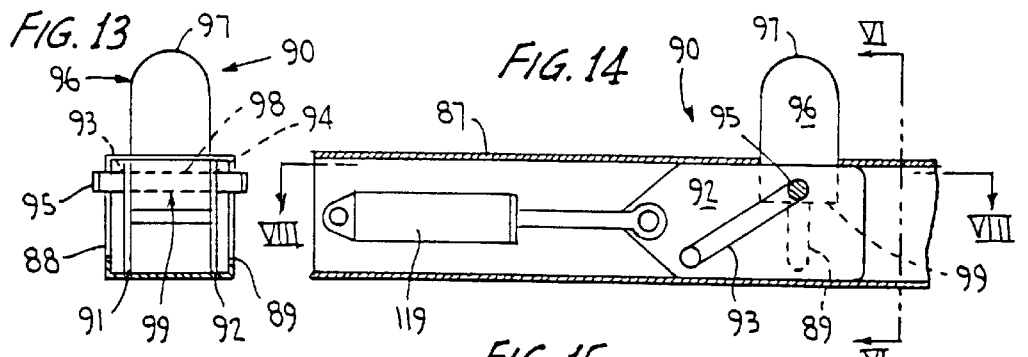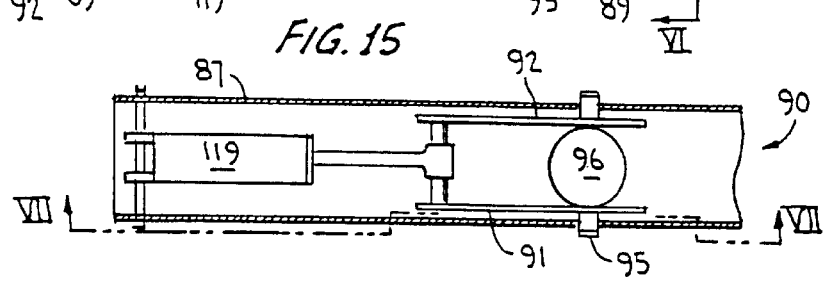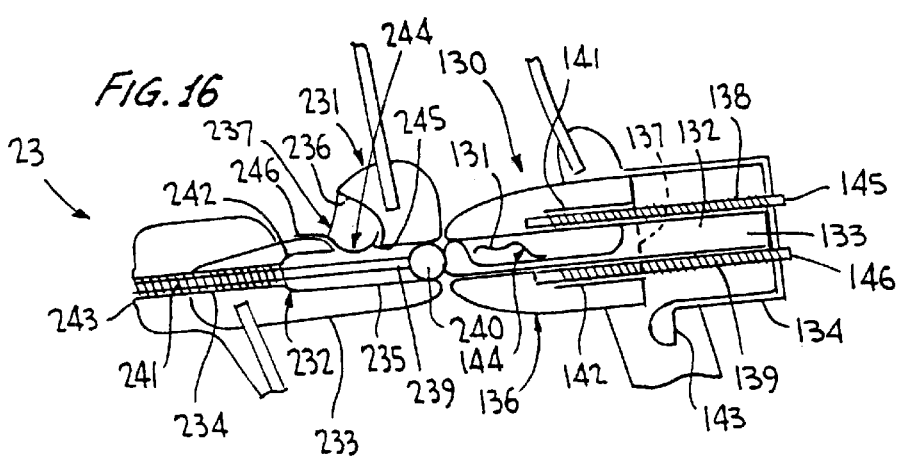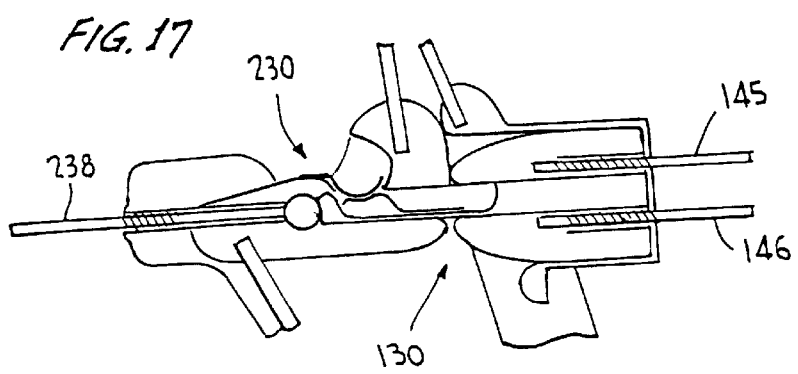

DEVICE FOR THE COMBINED RENTING OF ELECTRICALLY DRIVEN VEHICLES, ESPECIALLY SCOOTERS, AND THE EXCHANGE AND RECHARGING OF THE VEHICLE BATTERIES

TECHNICAL FIELD

This invention relates to a device for accommodating electrically driven battery powered vehicles, especially two and three-wheel scooters, for automatically handling the vehicle renting procedures and for exchanging and recharging the batteries.

BACKGROUND ART

Usually, the only liquid fuel vehicles are rented, but these are not the most suitable vehicles for city use because of the well known problems of pollution and traffic that they cause, besides, these vehicles require fuelling at dedicated service stations, which hardly ever coincide with the rental company premises.

A first alternative consists of vehicles powered by rechargeable batteries at the points of departure or arrival, this mode of transportation, in order to be compatible with an intensive use, requires the automatic exchange of the batteries for recharging, at the least. The known automatic battery exchange systems are usually capable of dealing with only one user at a time, and, therefore, they are unable to cater for a large number of users without increasing the number of recharging stations; but this solution would require a greater amount of space and more facilities. A further drawback is related to the shape of the batteries, which must be adapted to the structure of the battery exchange system which, in the majority of cases, is not compatible with the batteries commonly for sale.

The state of the art currently provides the technical solutions requiring the vehicles to park in automated parking areas and separate facilities for renting the vehicles and for exchanging and recharging the batteries; as regards the automated parking areas, we would like to mention the patents UD/92/A/48 by Grion and UD/92/A/108 by Fabris. The former relates to a multilevel garage for motor vehicles with a main lift and a set of roller decks or conveyors controlled by a computerized unit for accommodating the vehicles inside a parking space and recording the position of each vehicle; the latter patent relates to a cylinder-shaped multilevel structure with a variable and rotating lift running up and down a vertical axis and enabling the access of the cars to the various levels from the ground floor.

Both the above mentioned solutions feature the drawback of requiring very large structures, with no special facilities for electrically driven vehicles, such as renting and battery exchange and recharging facilities, nor do they allow for a combined use by different types of vehicles. There are also some computerized systems for exchanging and recharging the batteries of electrically driven vehicles, such as the European patent application EP 0 476 405, by Borgel, which relates to a goods handling system in a factory, where the battery powered vehicles run in dedicated aisles and the batteries feature a hardware card storing a code for their unequivocal identification and for recording all the charge data, which is transmitted to a computerized central unit, where the data is assessed, according to certain algorithms, to determine whether the vehicles must be called in to exchange and recharge the batteries. Although this patent concerns a different field of application than the present invention, it must be pointed out that the vehicles are trucks used for handling goods and moving within dedicated aisles and that the patent provides for no automated systems for exchanging and recharging the batteries.

With reference to the specific field of application of the present invention, relating to the automated exchange and subsequent recharging of the batteries, a solution is given in the patent FI/91/A/258 by D'Ascanio; whose key feature is the possibility of exchanging the batteries exclusively from the underside of the vehicle; this entails such characteristic features as; the battery exchange station must consist of a pit located beneath the vehicle parking space; the shape of the batteries must be such as to be fitted into the removed from the vehicle with ease besides the plugging into the sockets and the handling of the batteries by means of special trucks.

This patent also provides for computerized means for monitoring and performing the operations, at both the battery recharging stations and in the batteries themselves. A first drawback of the D'Ascanio patent, however, is that the battery exchange station requires a battery storeroom for each exchange device, entailing excavation and underground construction work; a further drawback is that it provides only for the use of custom-made batteries.

DISCLOSURE OF INVENTION

The present invention principally relates to a combined system for renting electrically driven battery powered vehicles for city use and for exchanging and recharging the batteries, all in one place.

The invention also relates to a system capable of catering. for a large number of users at a single battery exchange and regarding station.

Furthermore, the present invention relates to a system providing for the use of batteries commonly found for sale, compatibly with the equipment, in order to avoid having to manufacture special batteries.

Last but not least, the present invention relates to a system that is easy to use and economic to operate, without the need of any complex know-how or skilled labour. These and other characteristics are achieved in this combined device for renting electrically driven vehicles, especially scooters, and exchanging and recharging the batteries used to power the vehicles, composed of:

- a box-shaped structure with a number of housings at the front of the same shape as the vehicle;
- at least one device moving on a vertical deck, consisting of container supports for carrying a certain number of batteries;
- devices for removing and fitting the containers from and into the vehicles and the supports;
- a device for opening and closing the doors of the vehicle housing spaces ;
- a device for locking and unlocking the vehicle inside its housing and, at the same time, for opening and closing the vehicle battery access doors;
- a device for correctly positioning the vehicle inside the above mentioned housings ;
- means of connection between the batteries and the 220 V mains, and between the vehicles and the computerized units for monitoring and handling the vehicle renting and battery exchange and recharging operations.

The further characteristics and benefits of the system shall be illustrated in the detailed description of the specific embodiment of the invention, given by way of example only, with reference to the following drawings in which:

BRIEF DESCRIPTION OF THE DRAWINGS

FIGS. 5 and 6, show a cross-section of the device, as seen from the top, with the battery removal and fitting device in the position of linking together the battery and the vehicle and in the position of fitting the battery into the housing, respectively;

FIGS. 7 and 8, show the III—III section of the device, with the housing-door opening/closing device and the vehicle door opening/closing device and the locking of the same in the closed and opened positions, respectively;

FIG. 9, shows IV—IV section of the conveyor;

FIG. 10, shows a lateral perspective of the IV—IV section of the conveyor;

FIG. 11, shows the vehicle housing door opening/closing device;

FIG. 12, shows the IX—IX section of the device, with the battery container support;

FIG. 13, shows the VI—VI section of the gripping mechanism of the battery removal and fitting device;

FIG. 14, shows the VII—VII section of the gripping mechanism of the battery removal and fitting device;

FIG. 15, shows the VIII—VIII section of the gripping mechanism of the battery removal and fitting device;

FIGS. 16 and 17, show the plug and the socket of the electrical connection, in the open and closed position, respectively.

Figure 1:
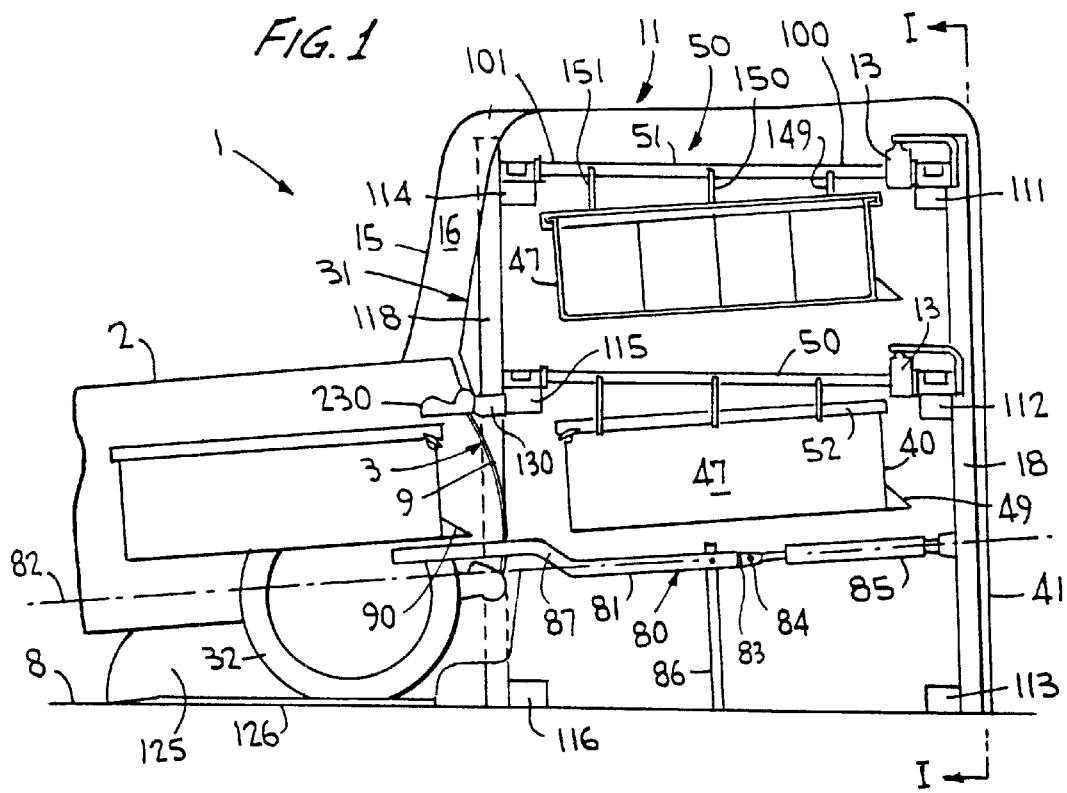
FIG. 1, shows a cross-section of the device, with the conveyor and the battery fitting and removal device.

Referring to the drawings, the device comprises a rectangular box 1 containing a certain number of housings 3 and 103 on the front 31, which housings are shaped so as to accommodate an electric vehicle 2, especially a scooter.

Figure 2:
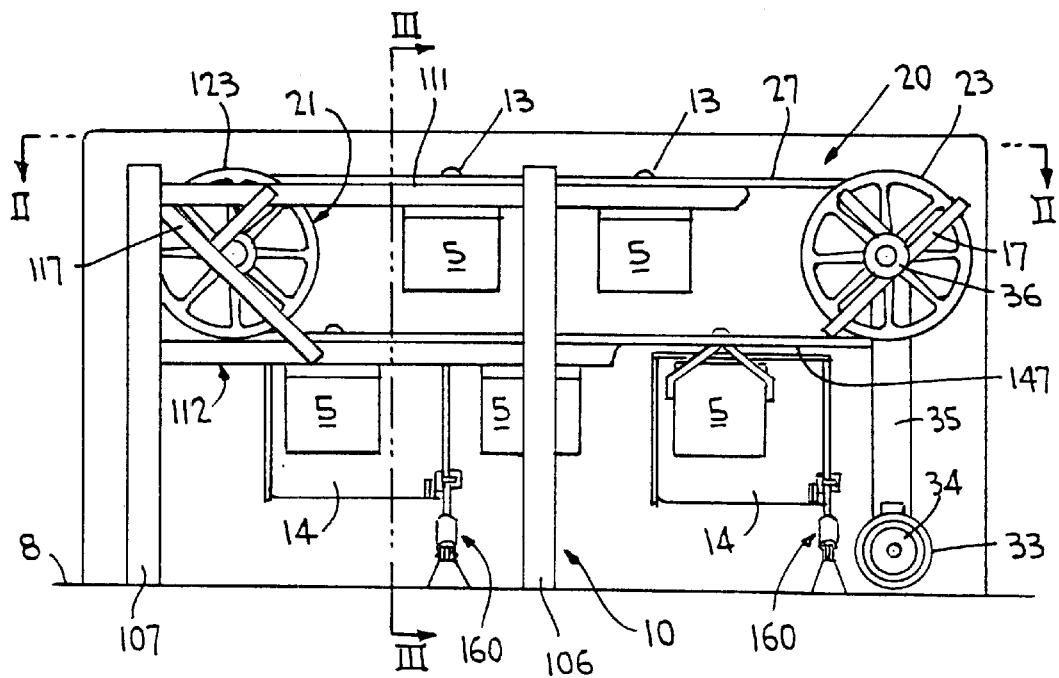
FIG. 2, shows the I—I section of the device, with the conveyor and the housing door opening and closing device.
Figure 3:
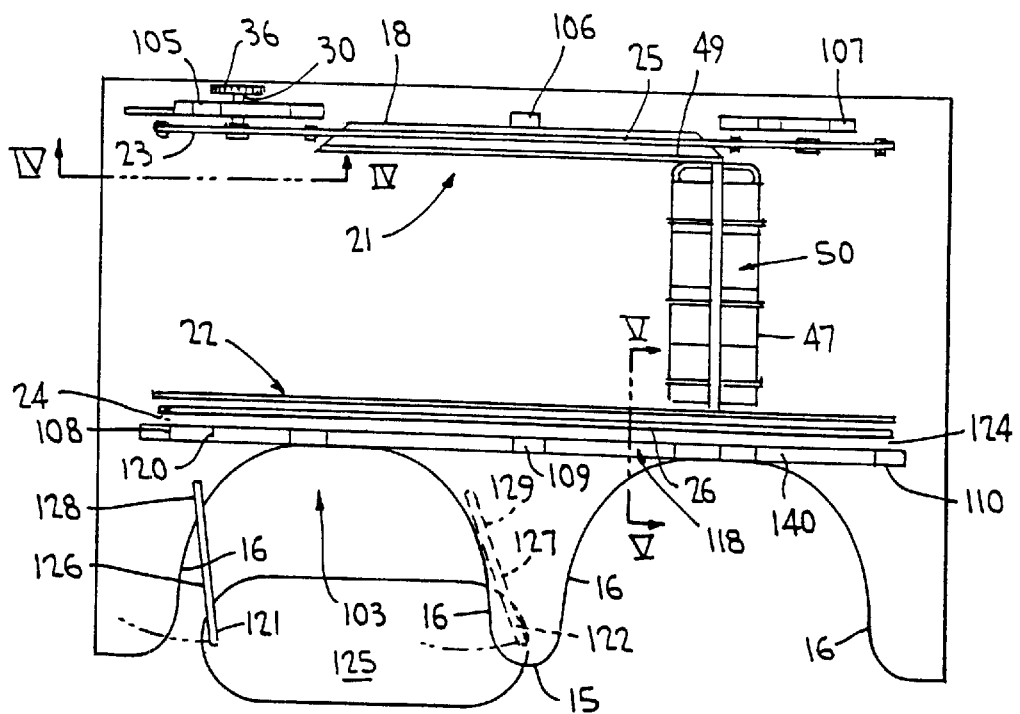
FIG. 3, shows the II—II section of the device, with the horizontally pivoted platform and the conveyor.

As shown in FIGS. 1 and 2, inside the box 1 there is a frame 10 supporting a conveyor 20, at a suitable distance from the floor 8; this conveyor, by means of rotations and translations on a vertical plane, enables the positioning of a number of supports 50 in a number of recharging spaces 13 in line with each housing 3 to 103, each support holds a container 47 of accommodating a number of batteries 5 connected the one to the others. On the floor 8, inside the box 1, and for each of the housing 3 and 103, there is a device 80 for fitting and removing the batteries 5 into and from both the vehicle 2 and the supports 50; there is also a device 160, for opening and closing each of the doors 14 of the housings 3 and 103.

For each of the housings 3 and 103, at the front 31 of the box 1, there is a device 180, as shown in FIGS. 7 and 8, for locking the vehicle 2 and, at the same time, opening (FIG. 8) the closed door 9 (FIG. 7) of the vehicle; furthermore, on the floor 8 there is an oscillating platform 120 enabling the vehicle 2 to move crosswise so as to be correctly accomodated inside each housing. Each housing is provided with a plug 130 for the electrical and electronic connection with a socket 230 on the vehicle 2.

A computerized system, which is not shown in the drawings, monitors all the above mentioned operations and, at the same time, handles the vehicle 2 renting operations.

In the upper part 11 of the box 1 there are inspection holes (not shown in the drawings) through which the maintenance operations can be carried out, as required; the housings 3 and 103, as shown in the figures 5 and 6, are separated the one from the other by means of a partition 15 whose walls 16 guide the vehicle 2 in its approach to the door 14, thus achieving the correct introduction of the plug 130 into the docket 230.

The frame 10 consists of a primary structure 18, adjacent to the rear part 41 of the box 1, consisting of the posts 105,106,107 and the beams 111, 112, 113, and the supports 17, 117, and a secondary structure 118, adjacent to the front section 31 of the box 1, consisting of the posts 108, 109, 110, and the beams 114, 115, 116, and the supports 120,140.

The conveyor 20, as shown in FIG. 2, is located between the upper beams 111 and 114 and the intermediate beams 112 and 115, respectively, of the primary structure 18 and the secondary structure 118, so as to create, inside box 1, a space above the floor 8 large enough to house some of the above mentioned devices, the conveyor elements of which will be described later on. This conveyor is powered by the motor 33 and driven by means of a chain 35 engaging a primary gear wheel 34 and a secondary gear wheel 36, the former is driven by the motor 33, while the latter is integral with a power shaft 30, to which a spoke wheel 23 is fastened, the shaft is supported by the support 17. A primary roundabout 21, located on the primary structure 18, is equipped with two spoke wheels 23 and 123 and two guides 27 and 147; in a likewise, a secondary roundabout 2, located in the secondary structure 118, is equipped with two spoke wheels 24 and 124 and two guides 28 and 148 (FIG. 8). These L-shaped guides are placed between the respective ends of the vertical diameters of the spoke wheels and, as shown in FIGS. 9 and 10, present an attachment 19 and 29, which follows the curvature of the spoke wheels, so as to guide the supports 50 during both the translation and the rotation.

Figure 4:
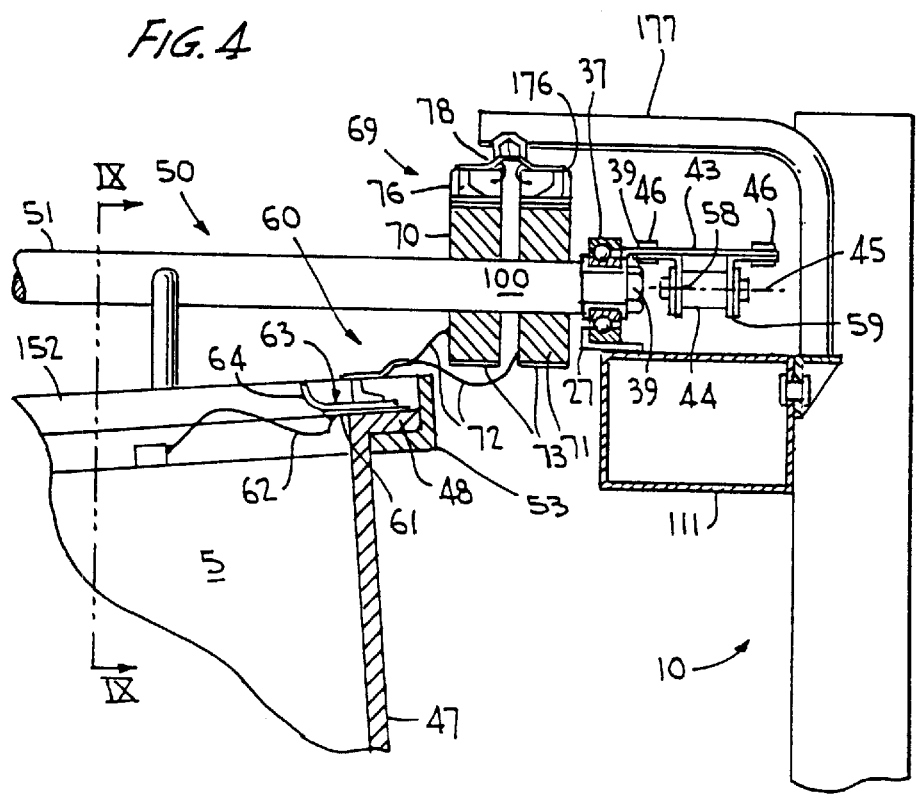
FIG. 4, shows V—V section of the device, which has been enlarged compared to the scale of the preceding figures, with a detail of part of the supporting means and the connections.

As shown in FIG. 4, to several of the links 44 of the chains 25 and 26 is attached a first set of two plates 58 and 59, rotating according to the axis 45 of the links; each of the plates of this first set is made integral with a second plate 43 by the known means 46, which, together with the bearings 37 and 38, are connected by the known fittings 39, to both ends 100 and 101 of a rod 51, which is a part of the support 50, as shown in FIG. 1. These supports are driven by the chains 25 and 26, thanks to the rolling of the bearings 37 and 38 along the guides 27 and 147 of the primary roundabout 21 and along the guides 28 and 148 of the second roundabout 22, thus carrying the batteries 5 housed in the container 47; this container is box-shaped, open at the top, which has a rectangular flared edge 48, furthermore, on the lower side of the face 40, facing the rear 102 of the vehicle 2, there is a handle 49 which engages a gripping mechanism 90 of the battery fitting and removal device 80.

During the introduction into the support 50, the container 47 runs on 2-L-shaped guides 52 and 152, with its flared edge 48, stopping against a ledge 53.

The L-shaped guides 52 and 152 are carried by the support 50, by means of a number of hooks 149, 150, 151, fastened along the entire length of the rod 51, the length of the sides 155 156, 157 (FIG. 7) of these hooks proportionally increase from the rear 41 to the front 31 of the box 1, so that the inclination of the guides is equal to that of the guide 4, constructed in the same manner, placed inside the vehicle 2; to facilitate the introduction in their support 50 and in the vehicle 2 the guides are provided, at their ends 55 and 104, with a lead 56 and 6 and a small wheel 57 and 7, respectively, as shown in FIG. 8.

When the flared edge 48 of the container 47 approaches the ledge 53 of the support 50, it determines the closing of the primary electrical connection 60, consisting of a set of two plates 61 and 66 for each pole, located on the flared edge 48 and connected to the battery 5 by means of a bipolar cable 62, as shown in FIGS. 4 and 12; another set of two plates 53 and 67, with a rounded edge 64 and 79, supported by two small brackets 65 and 68 projecting from the ledge 53 determines the perfect adherence between the first and the second set of plates, due to their elasticity. A second electrical connection 69 is achieved by means of two toroidal rings 70 and 71, joined securely to the rod 51 and connected to the primary connection 60 by means of the cable 72; the surface of these rings is coated with an electrical conductor and, as a result of the translation of the support 50, they engage with the concavity 75 of the base 74 of the two U-shaped conductors 76 and 176. These U-shaped elements are supported by a support 78 fixed to the upper beam 111 of the frame 10, at the end 177 of which support there is a flexible link-up 78 of the two conductors 76 and 176.

The above mentioned operations, namely, the introduction and removal of the batteries 5 into and from the vehicle 2 and the supports 50, are performed by the device 80 consisting of an oscillating lever 81 on a slightly inclined horizontal surface 82. One extremity 83 of this lever features a pivot 84 which connects this arm to a piston 85; in the proximity of this first extremity there is a fulcrum pin 86, achieved by means of a conventional mechanical system, around which the lever rotates, a second extremity 87, curved compared to the straight lever 81, is provided with a gripping mechanism 90 which engages the handle 49 of the container 47.

This operation, as shown in the figures 13,14 and 15, is performed by means for a small piston 119, fixed inside the end 87, which translate the two plates 91 and 92 in both directions, each of which features an oblique hold 93 and 94; a pin 95 runs inside the above mentioned oblique holes and in two vertical holes 88 and 89 in the extremity 87, thus imparting a vertical translation to a pawl 96; this pawl has a semispherical end 97 for facilitating the engagement to the handle 49 and a cylindrical channel 98 placed axially along a diameter in the end 99 opposite to the semispherical extremity 97.

Before exchanging the batteries 5, the door 14 of the housing 3 is opened by the device 160; this device is provided with a piston 161 whose cylinder 162 is fastened to the floor 8 by means of a fastening 164 and whose plunger 163 causes the vertical rotation of a rod 165. The end 166 of this rod is hinged to the box 1 and is connected, in its centre-line 167, to the plunger 163 by means of a pivot 168; end end 169, opposite to the extremity 166, is connected to the door 14 by known fittings, enabling their relative rotation. This door, as shown in FIGS. 7 and 8, is opened and closed by the rod 165 and oscillates vertically due to the two pins 158 and 159 (FIG. 11) sliding in a guide 178 and 179, respectively, in the box 1. The unauthorized use of the vehicle 2 is prevented by the vehicle locking mechanism 180, which also enables the opening of the door 9 of the vehicle 2; this mechanism consists of a first lever 181 which may be activated by the wheel 32, and whose fulcrum pin 182 is hinged to the box 1 close to the floor 8. This first lever rotates and engages a pin 183, fixed to the end 184 opposite the fulcrum pin 182 inside a housing 186 in the first extremity 187 of a second lever 185; this may simultaneously lock the vehicle 2 and cause the second lever 185 to rotate. This second lever is L-shaped, with the angle 188 pivoted to the vehicle 2; this housing 186 is open and is shaped like one-half of the slot, so as to enable the pin 183 to approach it and then run inside it. A third lever 191, also pivoted with an extremity 192 to the vehicle 2, features a longitudinal slot 193 inside which there runs a pin 189 of a second extremity 190 of the L-shaped lever 185; this running movement causes the rotation of the third lever 191 around the axis of the extremity 192 determining the opening or closing of the door 9, since this door is fastened, by conventional fittings, to the extremity 195 of the third lever 191.

The platform 125 is located on the floor 8 and oscillates above a horizontal plane by means of two rods 126 and 127, pivoted to the respective extremities 128 and 129 as connected by conventional fasteners to the above mentioned platform,at the extremities 121 and 122; the platform 125, as previously mentioned, allows the correct positioning of the vehicle 2 in the housings 3 and 103, so as to enable the perfect introduction of the plug 130 into the relative socket 230 of the vehicle 2. The socket consists of an L-shaped housing 231 inside which there is a first cavity 232, coaxial with the longer side 233, this first cavity features a final part 234 with a smaller section compared to the initial part 235, and a second cavity 236 inside the internal corner 237, and communicating with the first cavity. Inside the first cavity there runs a small rod 238 whose end 239, facing towards the plug 130, features a bulb 240 housed in the initial part 235 and running inside it; inside the final part 234 and coaxially to the small rod 238 there is a spring 241, between a first 242 and a second 243 lock; the former is integral with the small rod 238, while the latter is fastened to the vehicle 2.

A first contact 244, provided with a convex portion 245 projecting in the first cavity 232 and a second flat portion 246 fastened to the housing of the 231, is housed inside the second cavity and adheres to a second contact 144 when the plug 130 is introduced into the socket 230. The second contact is housed inside a pocket 131 to the receptacle 132; this receptacle is fastened by an extremity 133 to a support 134 enabling the running, along its entire length, of an ogival bush 136, which translates, coaxially to the receptacle by means of a through hole 137 whose axis coincides with that of the receptacle; the bush 136 is returned to its closed position by two springs 138 and 139 housed inside two blind cavities 141 and 142 made on the bottom 143 of the bush; these springs are coaxial with the two guides 145 and 146 introduced inside the bush and sliding in the support 134.

The global operation of the equipment features an initial request phase, when the user requests the renting, and a second phase when the computerized system activates the various mechanical devices.

The request is made by conventional computerized means and consists in the transmission of the user data and the granting of the vehicle.

Once this phase has been completed, the computerized system commands the mechanisms 180 to disengage the vehicle 2 and close the door 9; the user may now use the vehicle 2 and, when he/she has finished, returns it by positioning it in the housing 3 or 103 of the box 1 which accepts it, due to its shape. This operation, due to the platform 125 which correctly positions the vehicle, determines the introduction of the plug 130 into the socket 230, thus enabling the transmission of the data relative to the use of the vehicle 2 to the computerized system. The user may thus view the price to be paid on a monitor (not shown) and make the payment, interacting solely with the computerized system. At the delivery of the vehicle 2 the computerized system, in a conventional manner, measures the charge of the batteries 5 used for powering the vehicle and exchanges them, if necessary. These operations consists in the following: a first phase, when the door 14 of the box 1 is opened by the device 160; a second phase, when the device 80 engages the battery 5, by means of the gripping mechanism 90, removes it from the guides 4 inside the vehicle 2 and introduces it into the guides 52 of the support 50; a third phase, when the conveyor 20 places a charged battery in line with the housing 3; a fourth phase, when the device 80 performs the previous operations the other way around.

Besides being exchanged, the batteries 5 are also recharged in the recharging spaces 13, provided for in various points of the conveyor 20; these housings are connected to the mains, by means of the electrical connections 60 and 69. The batteries 5 may also be recharged, if necessary, directly from the vehicle 2, by means of the plug 130 and socket 230 system.

The embodiment of the invention described herein may be amended, preserving the basic idea, and all the details may be replaced with technically equivalent ones.

What is claimed is:

1. An automated rental system for battery powered scooters comprising in combination,
    a scooter receptacle housing means for receiving at least one scooter thereinto into a working relationship for servicing a rental transaction therein and delivering rental scooters therefrom,
    battery servicing means within the housing for processing batteries of scooters returned from a rental transaction to ready the scooters for a further rental transaction, and
    computerized control means operable for automated monitoring, commanding and controlling both vehicle renting and battery servicing operations for scooter rentals and returns.

2. The rental system of claim 1 further comprising mating electrical connection means in the scooters and the receptacle housing means for transmission of scooter operating data into the computerized control means.

3. The rental system of claim 2 further comprising battery charge monitoring means in the computerized control system.

4. The rental system of claim 3 further comprising battery exchange means in the scooter receptacle housing operable to remove discharged batteries from the scooters and replacing them with charged batteries.

5. The rental system of claim 4 further comprising battery charging means in the scooter receptacle housing, and computer monitored means for charging batteries removed from rented scooters readying them for replacement as needed.

6. The rental system of claim 3 further comprising means for recharging batteries located in a scooter in said working relationship in response to the computer control means.

7. The rental system of claim 1 wherein said receptacle housing further comprises compartmented structure for receiving a plurality of scooters into said working relationship.

8. The rental system of claim 1 further comprising a motor powered conveyor system located in said scooter receptacle housing for transporting a plurality of battery storage containers over a path for receiving batteries for scooters and depositing batteries in scooters, and battery replacement means controlled by said computerized control means for removing and replacing scooter batteries automatically into the conveyor system.

9. The rental system of claim 1 wherein said scooter receptacle housing further comprises an access door to be opened in response to entry of a scooter.

10. An automated rental system for battery powered scooters, comprising in combination,
    a scooter receptacle housing for receiving at least one scooter thereinto a working relationship for servicing a rental transaction and delivering rental scooters,
    battery servicing means within the housing for processing batteries of scooters returned from a rental transaction to ready the scooters for a further rental transaction,
    computerized control means operable for automated monitoring, commanding and controlling both vehicle renting and battery servicing operations for scooter rentals and returns,
    mating electrical connection means in the scooters and receptacles for transmission of scooter operating data into computerized control means, and
    a movable platform for positioning a scooter into position for mating the electrical connection means in the scooters and receptacles.

11. An automated rental system for battery powered scooters, comprising in combination,
    a scooter receptacle housing for receiving at least one scooter thereinto into a working relationship for servicing a rental transaction and delivering rental scooters,
    battery servicing means within the housing for processing batteries of scooters returned from a rental transaction to ready the scooters for a further rental transaction,
    computerized control means operable for automated monitoring, commanding and controlling both vehicle renting and battery servicing operations for scooter rentals and returns,
    a motor powered conveyor system located in said scooter receptacle housing for transporting a plurality of battery storage containers over a path for receiving batteries for scooters and depositing batteries in scooters, and battery replacement means controlled by said computerized control means for removing and replacing scooter batteries automatically into the conveyor system, and electrical connection means connected to a main supply line for charging batteries in the battery storage containers as they are transported over said path.

12. An automated rental system for battery powered scooters, comprising in combination,
    a scooter receptacle housing for receiving at least one scooter thereinto into a working relationship for servicing a rental transaction and delivering rental scooters,
    battery servicing means within the housing for processing batteries of scooters returned from a rental transaction to ready the scooters for a further rental transaction, and
    computerized control means operable for automated monitoring, commanding and controlling both vehicle renting and battery servicing operations for scooter rentals and returns,
    a motor powered conveyor system located in said scooter receptacle housing for transporting a plurality of battery storage containers over a path for receiving batteries for scooters and depositing batteries in scooters, and battery replacement means controlled by said computerized control means for removing and replacing scooter batteries automatically into the conveyor system, and
    a piston operated battery gripping mechanism for transporting a battery between said battery storage containers and said scooters.

* * * * *

UNITED STATES PATENT AND TRADEMARK OFFICE
CERTIFICATE OF CORRECTION

PATENT NO. : 6,371,230 B1 Page 1 of 1
DATED : April 16, 2002
INVENTOR(S) : Alberto Ciarla et al.

It is certified that error appears in the above-identified patent and that said Letters Patent is hereby corrected as shown below:

<u>Title page,</u>
Item [57], ABSTRACT,
Line 6, "device" should read -- conveyor --.
Line 8, "conveyors" should read -- devices --.

<u>Column 2,</u>
Line 30, "regarding" should read -- recharging --.
Line 43, "as the vehicle" should read -- a particular vehicle --.

<u>Column 3,</u>
Line 57, "platform 120" should read -- platform 125 --.

<u>Column 4,</u>
Line 5, "docket" should read -- socket-- .
Line 26, "roundabout 2" should read -- roundabout 22 --.

<u>Column 5,</u>
Line 4, "plates 53" should read -- plates 63 --.
Line 49, "end end" should read -- end --.
Line 57, ", and whose" should read -- whose --.

<u>Column 6,</u>
Line 7, "fittings," should read -- fittings --.

Signed and Sealed this

Fourth Day of February, 2003

JAMES E. ROGAN
*Director of the United States Patent and Trademark Office*